United States Patent
Pawar

(10) Patent No.: US 12,034,694 B2
(45) Date of Patent: Jul. 9, 2024

(54) PERFORMANCE IMPROVEMENT OF IPsec TRAFFIC USING SA-GROUPS AND MIXED-MODE SAs

(71) Applicant: VMware LLC, Palo Alto, CA (US)

(72) Inventor: Sudesh Pawar, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/238,177

(22) Filed: Aug. 25, 2023

(65) Prior Publication Data

US 2023/0403252 A1 Dec. 14, 2023

Related U.S. Application Data

(63) Continuation of application No. 17/715,510, filed on Apr. 7, 2022, now Pat. No. 11,863,514.

(30) Foreign Application Priority Data

Jan. 14, 2022 (IN) .............................. 202241002279

(51) Int. Cl.
*H04L 61/251* (2022.01)
*H04L 12/46* (2006.01)
*H04L 61/256* (2022.01)

(52) U.S. Cl.
CPC ........ *H04L 61/251* (2013.01); *H04L 12/4633* (2013.01); *H04L 61/2571* (2013.01)

(58) Field of Classification Search
None
See application file for complete search history.

(56) References Cited

U.S. PATENT DOCUMENTS 6,330,562 B1 12/2001 Boden et al.
6,968,441 B1 11/2005 Schnee
(Continued)

FOREIGN PATENT DOCUMENTS

CA 2870048 A1 11/2013
CN 102801695 A 11/2012
(Continued)

OTHER PUBLICATIONS

Barker, Elaine, et al., "Guide to IPsec VPNs," NIST SP 800-77 Rev. 1, Jun. 30, 2020, 166 pages, retrieved from https://csrc.nist.gov/publications/detail/sp/800-77/rev-1/final.
(Continued)

*Primary Examiner* — Phyllis A Book
(74) *Attorney, Agent, or Firm* — Quarles & Brady LLP

(57) ABSTRACT

Some embodiments provide a method of load balancing data message flows across multiple secure connections. The method receives a data message having source and destination addresses formatted according to a first protocol. Based on the source and destination addresses, the method selects one of the multiple secure connections for the data message. Each of the secure connections handles a first set of connections formatted according to the first protocol and a second set of connections formatted according to a second protocol that is an alternative to the first protocol. The method securely encapsulates the data message and forwards the encapsulated data message onto a network. The encapsulation includes an identifier for the selected secure connection.

20 Claims, 9 Drawing Sheets

(56) References Cited

U.S. PATENT DOCUMENTS

| | | |
|---|---|---|
| 7,003,118 B1 | 2/2006 | Yang et al. |
| 7,243,225 B2 | 7/2007 | Poeluev et al. |
| 7,284,111 B1 | 10/2007 | Sae-Koe |
| 7,373,660 B1 | 5/2008 | Guichard et al. |
| 7,379,451 B1* | 5/2008 | Brebner .................. H04L 45/00 370/356 |
| 7,383,353 B2 | 6/2008 | Valdevit et al. |
| 7,555,544 B1 | 6/2009 | Rattner et al. |
| 7,814,310 B2 | 10/2010 | Bouchard et al. |
| 7,962,358 B1 | 6/2011 | Fernandez et al. |
| 8,566,452 B1 | 10/2013 | Goodwin, III et al. |
| 9,483,286 B2 | 11/2016 | Basavaiah et al. |
| 9,535,750 B1 | 1/2017 | Wilkes et al. |
| 9,588,813 B1 | 3/2017 | Dubey et al. |
| 9,755,972 B1 | 9/2017 | Mao et al. |
| 9,813,379 B1 | 11/2017 | Shevade et al. |
| 9,929,970 B1 | 3/2018 | Matthews et al. |
| 10,020,984 B1 | 7/2018 | Jork et al. |
| 10,257,167 B1 | 4/2019 | Matthews et al. |
| 10,491,466 B1 | 11/2019 | Hira et al. |
| 10,498,529 B1 | 12/2019 | Hashmi et al. |
| 10,498,708 B2 | 12/2019 | Wang et al. |
| 10,601,779 B1 | 3/2020 | Matthews et al. |
| 10,623,372 B2 | 4/2020 | Wang et al. |
| 10,701,107 B2 | 6/2020 | Gopal et al. |
| 11,075,888 B2 | 7/2021 | Jain et al. |
| 11,095,617 B2 | 8/2021 | Jain et al. |
| 11,347,561 B1 | 5/2022 | Kumar et al. |
| 11,729,153 B2 | 8/2023 | Jain et al. |
| 2002/0010866 A1 | 1/2002 | McCullough et al. |
| 2002/0097724 A1 | 7/2002 | Halme et al. |
| 2003/0088787 A1 | 5/2003 | Egevang |
| 2004/0143734 A1 | 7/2004 | Buer et al. |
| 2005/0165953 A1 | 7/2005 | Oba et al. |
| 2005/0198531 A1 | 9/2005 | Kaniz et al. |
| 2005/0213603 A1 | 9/2005 | Karighattam et al. |
| 2006/0002388 A1 | 1/2006 | Grebus et al. |
| 2006/0029278 A1 | 2/2006 | Alasia et al. |
| 2006/0227807 A1 | 10/2006 | Jakubik et al. |
| 2008/0123593 A1 | 5/2008 | Fujita et al. |
| 2008/0144625 A1 | 6/2008 | Wu et al. |
| 2008/0165964 A1 | 7/2008 | Lewis et al. |
| 2008/0307024 A1 | 12/2008 | Michaels et al. |
| 2009/0122990 A1 | 5/2009 | Gundavelli et al. |
| 2009/0144819 A1* | 6/2009 | Babbar .................. H04L 47/10 726/13 |
| 2009/0231999 A1 | 9/2009 | Verma et al. |
| 2010/0138560 A1 | 6/2010 | Kivinen et al. |
| 2010/0191958 A1 | 7/2010 | Chen |
| 2010/0217949 A1 | 8/2010 | Schopp et al. |
| 2011/0035740 A1 | 2/2011 | Powell et al. |
| 2011/0113236 A1 | 5/2011 | Chenard et al. |
| 2012/0027002 A1 | 2/2012 | Jones et al. |
| 2012/0027314 A1 | 2/2012 | Lee et al. |
| 2012/0102278 A1 | 4/2012 | Joffray et al. |
| 2012/0124591 A1 | 5/2012 | Cadambi et al. |
| 2012/0170459 A1 | 7/2012 | Olesinski et al. |
| 2012/0303949 A1 | 11/2012 | Liu et al. |
| 2014/0089480 A1 | 3/2014 | Zhu |
| 2014/0108665 A1 | 4/2014 | Arora et al. |
| 2014/0313932 A1 | 10/2014 | Saltsidis |
| 2015/0052525 A1 | 2/2015 | Raghu |
| 2015/0195138 A1 | 7/2015 | Horman |
| 2015/0207779 A1* | 7/2015 | Hsu .................. H04L 63/10 726/4 |
| 2015/0363240 A1 | 12/2015 | Koizumi |
| 2016/0057108 A1 | 2/2016 | Hu |
| 2016/0088072 A1 | 3/2016 | Likhtarov et al. |
| 2016/0135074 A1 | 5/2016 | Welin et al. |
| 2016/0182509 A1 | 6/2016 | Kantecki et al. |
| 2016/0212098 A1 | 7/2016 | Roch |
| 2016/0226815 A1 | 8/2016 | Wan et al. |
| 2016/0277478 A1 | 9/2016 | Narasimhamurthy |
| 2016/0352628 A1 | 12/2016 | Reddy et al. |
| 2017/0024293 A1 | 1/2017 | Bell et al. |
| 2017/0054603 A1 | 2/2017 | Kulkarni et al. |
| 2017/0063787 A1 | 3/2017 | Kwok et al. |
| 2017/0063979 A1 | 3/2017 | Saeki |
| 2017/0111826 A1* | 4/2017 | Sankar .................. H04W 28/20 |
| 2017/0264600 A1* | 9/2017 | Froelicher ........... H04L 63/0823 |
| 2017/0331724 A1 | 11/2017 | Carney |
| 2017/0374025 A1* | 12/2017 | Pan .................. H04L 63/164 |
| 2018/0054458 A1 | 2/2018 | Marck et al. |
| 2018/0062875 A1 | 3/2018 | Tumuluru |
| 2018/0067786 A1 | 3/2018 | Trung et al. |
| 2018/0131521 A1 | 5/2018 | Yang et al. |
| 2018/0176124 A1 | 6/2018 | Kancherla et al. |
| 2018/0241655 A1 | 8/2018 | Tsirkin |
| 2019/0114206 A1 | 4/2019 | Murugesan et al. |
| 2019/0173850 A1* | 6/2019 | Jain .................. H04L 9/088 |
| 2019/0173851 A1* | 6/2019 | Jain .................. H04L 63/0485 |
| 2019/0190892 A1 | 6/2019 | Menachem et al. |
| 2019/0266217 A1 | 8/2019 | Arakawa et al. |
| 2019/0306086 A1 | 10/2019 | Boutros et al. |
| 2019/0372936 A1 | 12/2019 | Sullenberger et al. |
| 2020/0059457 A1* | 2/2020 | Raza .................. H04L 69/14 |
| 2020/0084192 A1* | 3/2020 | Wang .................. H04L 63/166 |
| 2020/0099670 A1 | 3/2020 | Kessler et al. |
| 2020/0186507 A1 | 6/2020 | Dhanabalan et al. |
| 2020/0351254 A1 | 11/2020 | Xiong et al. |
| 2020/0403922 A1 | 12/2020 | Yu et al. |
| 2021/0021523 A1 | 1/2021 | Wang et al. |
| 2021/0136049 A1 | 5/2021 | Wang et al. |
| 2021/0185025 A1 | 6/2021 | Wang et al. |
| 2021/0377232 A1 | 12/2021 | Jain et al. |
| 2021/0385203 A1 | 12/2021 | Wang et al. |
| 2021/0392121 A1 | 12/2021 | Thangapandi et al. |
| 2021/0400029 A1 | 12/2021 | Wang et al. |
| 2022/0158979 A1* | 5/2022 | Shribman .................. H04L 63/029 |
| 2022/0191139 A1 | 6/2022 | Dutta |
| 2022/0191145 A1 | 6/2022 | Duraj et al. |
| 2022/0291970 A1 | 9/2022 | Kumar et al. |
| 2022/0393967 A1 | 12/2022 | Solanki et al. |
| 2022/0393981 A1 | 12/2022 | Solanki et al. |
| 2022/0394014 A1 | 12/2022 | Wang et al. |
| 2022/0394016 A1 | 12/2022 | Solanki et al. |
| 2022/0394017 A1 | 12/2022 | Solanki et al. |
| 2023/0118718 A1 | 4/2023 | Solanki et al. |
| 2023/0231826 A1 | 7/2023 | Pawar |

FOREIGN PATENT DOCUMENTS

| | | |
|---|---|---|
| CN | 110677426 A | 1/2020 |
| KR | 20030013496 A | 2/2003 |
| WO | 2016020727 A1 | 2/2016 |
| WO | 2016049609 A1 | 3/2016 |
| WO | WO-2021009554 A1 * | 1/2021 |
| WO | 2022260711 A1 | 12/2022 |

OTHER PUBLICATIONS

Kim, Joongi, et al., "NBA (Network Balancing Act): A High-performance Packet Processing Framework for Heterogeneous Processors," EuroSys '15, Apr. 21-24, 2015, 14 pages, ACM, Bordeaux, France.

Muramatsu, Shin, et al., "VSE: Virtual Switch Extension for Adaptive CPU Core Assignment in softirq," 2014 IEEE 6th International Conference on Cloud Computing Technology and Science, Dec. 15-18, 2014, 6 pages, IEEE, Singapore.

Non-Published Commonly Owned U.S. Appl. No. 18/224,558, filed Jul. 20, 2023, 51 pages, Nicira, Inc.

Son, Jeongseok, et al., "Protego: Cloud-Scale Multitenant IPsec Gateway," Proceedings of the 2017 USENIX Annual Technical Conference (USENIX ATC '17), Jul. 12-14, 2017, 15 pages, USENIX Association, Santa Clara, CA.

* cited by examiner

PERFORMANCE IMPROVEMENT OF IPsec TRAFFIC USING SA-GROUPS AND MIXED-MODE SAs

CLAIM OF BENEFIT TO PRIOR APPLICATIONS

This application is a continuation application of U.S. patent application Ser. No. 17/715,510, filed Apr. 7, 2022, now published as U.S. Patent Publication 2023/0231826. U.S. patent application Ser. No. 17/715,510, now published as U.S. Patent Publication 2023/0231826, is incorporated herein reference.

BACKGROUND

Today, typical datapath pipelines for outgoing IPsec traffic include processing of both IPv4 traffic and IPv6 traffic sent by local machines. During standard internet key exchange (IKE) negotiations for route-based IPsec VPNs, two sets of security associations (SAs) are negotiated for different traffic types (i.e., one SA for IPv4 and one SA for IPv6). As a result, if the IPsec gateway primarily processes IPv4 or IPv6 traffic, some of the paths and links between the local and remote gateways are overutilized. Additionally, at the receiving gateway, when there are not many tunnels configured, the decryption process cannot fully utilize multiple CPUs, thereby limiting the overall decryption performance.

BRIEF SUMMARY

Some embodiments of the invention provide a method of load balancing data message flows across multiple secure connections (e.g., multiple IPsec security associations (SAs)), each of which handles a first set of connections formatted according to a first protocol (e.g., IPv4) and a second set of connections formatted according to a second protocol (e.g., IPv6). When a data message formatted according to either of the protocols is received and identified for secure transmission, the method selects one of the multiple secure connections (e.g., using a load balancing technique), securely encapsulates the data message, and forwards the encapsulated data message onto a network towards its destination. The encapsulation, in some embodiments, includes an identifier for the selected secure connection (e.g., a security parameter index (SPI)).

In some embodiments, the method is performed by a first gateway device that is local to a source machine from which the data message originated. Before receiving the data message, in some embodiments, the first gateway device and a second gateway device that is local to a destination machine of the data message engage in an Internet key exchange (IKE) session, with the first gateway device acting as an initiator for the session. During the IKE session, a group object (e.g., an SA group) that points to the multiple secure connections is negotiated (along with other standard parameters) with the second gateway device and created at the first gateway device. In some embodiments, if the second gateway device (e.g., an IKE module operating at the second gateway device to handle the IKE session) supports SA groups, the second gateway device accepts the group object and creates and installs its own SA group into its datapath.

Additionally, the multiple secure connections are grouped and a mixed mode is enabled for each of these secure connections such that each secure connection securely encapsulates data messages of both first and second traffic types associated with the first and second protocols. During this negotiation, some embodiments determine whether network address translation traversal (NAT-T) should be enabled (e.g., based on whether a network address and port translation device is identified within the path between the first and second gateway device). In some embodiments, the first gateway device enables the mixed mode for the secure connections when NAT-T is enabled.

Prior to selecting one of the multiple secure connections, some embodiments forward the data message to a dual-stack virtual tunnel interface (VTI) of the first gateway device according to either a first forwarding table for connections formatted according to the first protocol or a second forwarding table for connections formatted according to the second protocol. The dual-stack VTI, in some embodiments, is associated with the multiple secure connections and points to the SA group object. To select one of the multiple secure connections for the data message based on the source and destination addresses, in some embodiments, the VTI (according to the defined SA group object) calculates a hash value used to perform the load balancing operation to select one of the secure connections. In some embodiments, the dual-stack VTI calculates this hash value using a five-tuple connection identifier (e.g., source and destination Internet Protocol (IP) addresses, source and destination port addresses, and protocol) associated with the data message.

In some embodiments, the first protocol is IPv4 and the second protocol is IPv6. Additionally, the multiple secure connections, in some embodiments, are different mixed-mode Internet Protocol Security (IPsec) security associations (SAs) that handle both IPv4 and IPv6 connections. Each of the mixed-mode SAs encapsulates data messages using either IPv4 or IPv6 network addresses, depending on the intervening network. The gateway device processes data messages for both IPv4 and IPv6 because machines (either executing on the gateway device or behind the gateway device) use a combination of IPv4 and IPv6 addresses. As a result of the load balancing operation, the totality of the data messages sent through the secure connections are load balanced across the multiple mixed-mode SAs. By comparison, if there is a designated IPv4 SA and a designated IPv6 SA, then the paths to which the SAs are pinned can become overloaded if most of the traffic is of one type or the other. Additionally, as explained below, some of the processing cores at the receiving gateway device that handles traffic for the prominent traffic type may also become overloaded.

The data message that is securely encapsulated by the selected SA, in some embodiments, has an outer destination address of the second gateway device that receives the securely encapsulated data message. Upon receiving the securely encapsulated data message, the second gateway device assigns the data message to a particular one of its processing cores based on the identifier (e.g., the SPI) for the selected SA. In some embodiments, the first gateway device (i.e., the SA group object of the first gateway device) selects among the multiple mixed-mode SAs by load balancing across the SAs such that the data messages received at the second gateway device are load balanced among the processing cores of the second gateway device. As a result, the second gateway device experiences better central processing unit (CPU) utilization and improved performance. If the first gateway device were to primarily use only one of the SAs (e.g., because traffic was primarily IPv4 or IPv6 so a designated SA for that traffic was used), then the processing core at the second gateway device would receive all this traffic with the same SPI and thus only use a single (potentially overloaded) processing core for the traffic.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
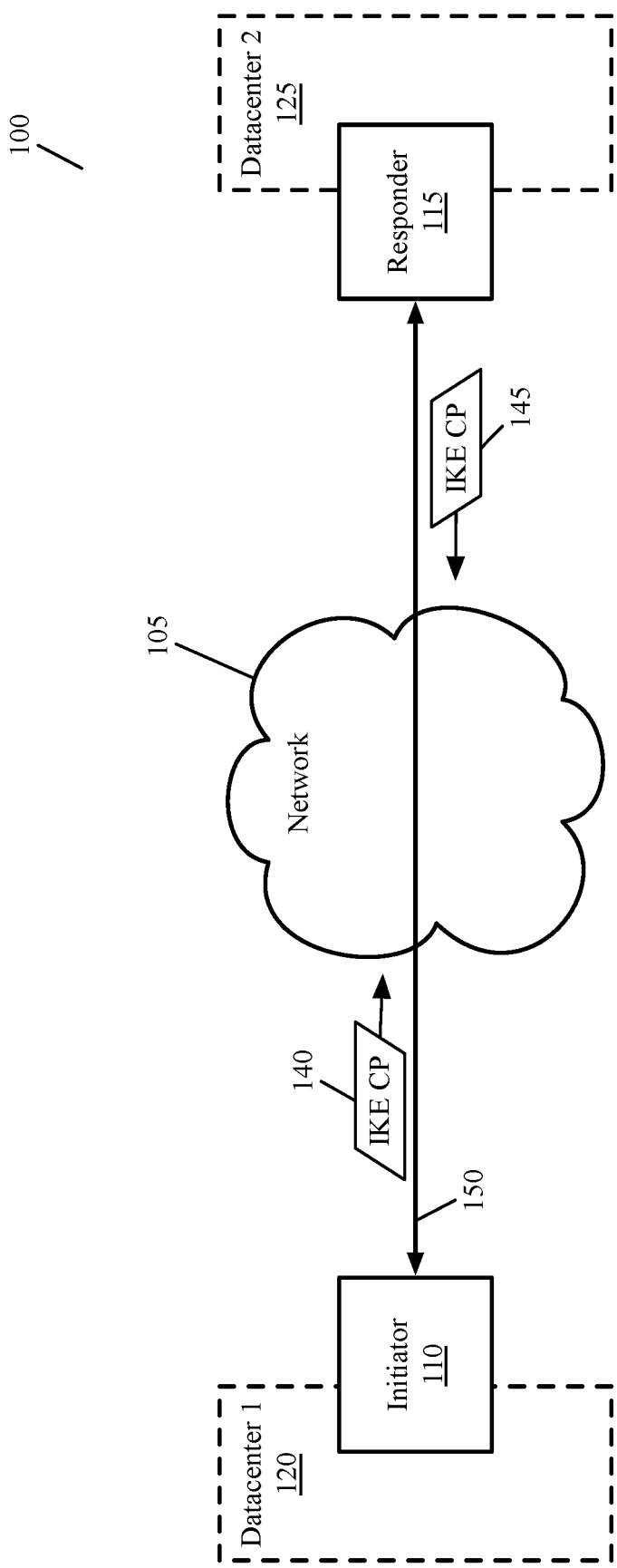
FIG. 1 conceptually illustrates an IKE session of some embodiments between an initiator at a first datacenter and a responder at a second datacenter for establishing secure communications between the datacenters.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of load balancing data message flows across multiple secure connections (e.g., multiple IPsec security associations (SAs)), each of which handles a first set of connections formatted according to a first protocol (e.g., IPv4) and a second set of connections formatted according to a second protocol (e.g., IPv6). When a data message formatted according to either of the protocols is received and identified for secure transmission, the method selects one of the multiple secure connections (e.g., using a load balancing technique), securely encapsulates the data message, and forwards the encapsulated data message onto a network towards its destination. The encapsulation, in some embodiments, includes an identifier for the selected secure connection (e.g., a security parameter index (SPI)).

In some embodiments, the method is performed by a first gateway device (also referred to herein as the initiator) that is local to a source machine from which the data message originated. Before receiving the data message, in some embodiments, the first gateway device and a second gateway device (also referred to herein as the responder) that is local to a destination machine of the data message engage in an Internet key exchange (IKE) session. During the IKE session, a group object (e.g., an SA group) that points to the multiple secure connections is created at the first gateway device.

Additionally, the multiple secure connections are grouped, and a mixed mode is enabled for each of these secure connections such that each secure connection securely encapsulates data messages of both first and second traffic types associated with the first and second protocols. During this negotiation, some embodiments determine whether network address translation traversal (NAT-T) should be enabled (e.g., based on whether a network address and port translation device is identified within the path between the first and second gateway device). In some embodiments, the first gateway device enables the mixed mode for the secure connections when NAT-T is enabled.

An SA is the establishment of shared security attributes between two network entities (e.g., between a pair of gateways of different datacenters, or between two network endpoints) to support secure communication (e.g., a virtual private network (VPN) connection/tunnel). An SA may correspond to a one-way or simplex connection. An SA may include attributes such as cryptographic algorithm and mode, traffic encryption key, and parameters for the network data to be passed over the connection. An SA is a form of contract between the two network entities detailing how to exchange and protect information among each other, including indicating how to encrypt/decrypt data. Each SA may include a mutually agreed-upon key, one or more secure protocols, and an SPI value identifying the SA, among other data.

FIG. 1 conceptually illustrates an IKE session of some embodiments between an initiator at a first datacenter and a responder at a second datacenter for establishing secure communications between the datacenters. In some embodiments, the IKE session 100 is used for establishing a virtual private network (VPN) session between the first and second datacenters 120 and 125. The initiator 110 and responder 115 are gateway devices, according to some embodiments. During the IKE session, the initiator 110 and responder 115 establish an IPsec tunnel 150 using the IKE protocol. The IPsec tunnel 150 is then used by the initiator 110 and responder 115 to negotiate encryption, authentication, and other protocols and other parameters (e.g., SAs), as illustrated by the control messages 140 and 145.

The network 105, in some embodiments, is implemented by an underlying physical infrastructure of wired and/or wireless communications mediums, routers, switches, etc., and, in some embodiments, may include the Internet, as well as any direct connections between the initiator 110 and responder 115. In some embodiments, the direct connections may refer to interconnections between network endpoints within a same datacenter and/or a same physical device, or other proprietary network connection interconnecting the initiator 110 and responder 115.

During the IKE session between the initiator 110 and responder 115, an SA group object (not shown) that points to multiple SAs is created within the initiator 110. As mentioned above, the negotiations between the initiator 110 and responder 115 include negotiations regarding parameters, such as the SAs. As a result of these SA negotiations during the IKE session, the multiple SAs are grouped, and mixed-mode is enabled such that each SA securely encapsulates data messages associated with the IPv4 and IPv6 protocols. In some embodiments, the grouping type for the multiple SAs is defined as an equal-cost multipath (ECMP) type grouping.

As mentioned, during this negotiation, some embodiments determine whether NAT-T should be enabled based on whether a network address and port translation (NAPT) device is identified within the path between the first and second gateway device. If a NAPT device is identified, then NAT-T should be enabled, which means that the source and destination ports of the encapsulating UDP header of the securely encapsulated data messages will always have the same value (e.g., 4500). This prevents the use of the source port as an entropy field, thereby preventing any load balancing of the securely encapsulated data messages from using this source port field. Thus, in some embodiments, the first gateway device enables mixed mode SAs and uses the SA group object when NAT-T is enabled so that identifiers for the different SAs can be used for this load balancing (described further below).

Figure 2:
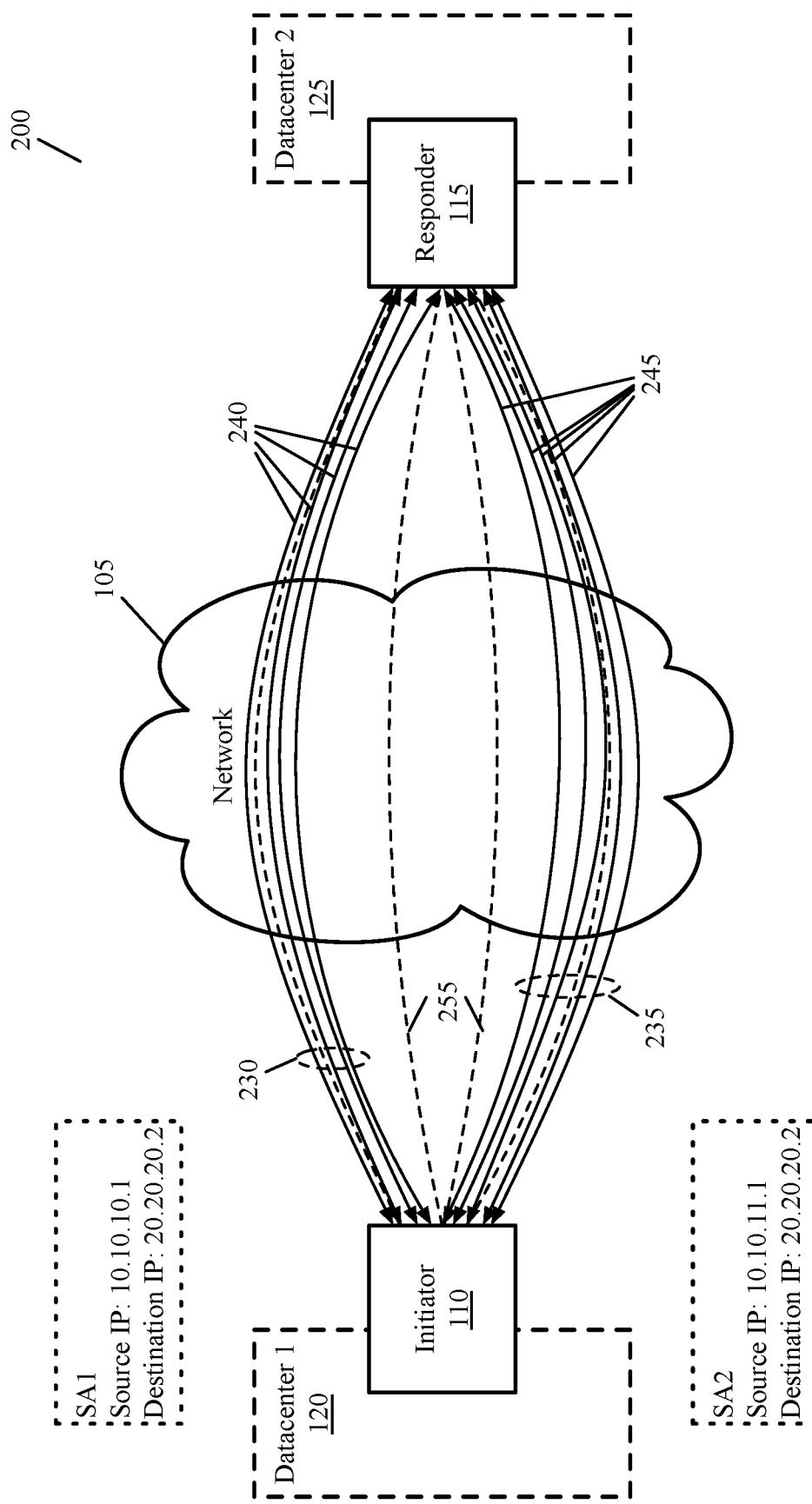
FIG. 2 conceptually illustrates a VPN session, in some embodiments, between the initiator and responder to send data across the network using multiple paths in multiple uplinks or tunnels.

FIG. 2 conceptually illustrates a VPN session 200, in some embodiments, between the initiator 110 and responder 115 to send data across the network 105 using multiple paths in multiple uplinks or tunnels. In this example, the VPN session 200 uses two SAs to send data across the network 105. The SA1 is used to encrypt and authenticate IPsec data for a VPN tunnel (or uplink) 230, which is associated with a source IP 10.10.10.1 and a destination IP 20.20.20.2, and the SA2 is used to encrypt and authenticate IPsec data for a VPN tunnel (or uplink) 235, which is associated with a source IP 10.10.11.1 and the destination IP 20.20.20.2. Specifically, any flows communicated from endpoints in the datacenter 120 to endpoints in the datacenter 125 may be encrypted at the first datacenter using SA1 and sent over the VPN tunnel 230, such as the flows 240, or using SA2 and sent over the VPN tunnel 235, such as the flows 245. Each of these VPN tunnels is a specific path through the network to which the SAs are pinned, represented by dashed lines between the initiator 110 and responder 115. As shown, additional paths 255 are available, to which neither of the SAs is pinned.

In some embodiments, the gateway 110 is configured with a VTI to handle data traffic to and from a VPN tunnel. A VTI is a logical routing layer interface configured at an end of a VPN tunnel to support route-based VPN with IPsec profiles attached to the end of the tunnel. Egressing traffic from the VTI is encrypted and sent to the VPN peer, and the SA associated with the tunnel decrypts the ingress traffic to the VTI. In the embodiments described herein, the VTI is a dual-stack VTI that supports both IPv4 and IPv6 traffic, and each of the SAs also supports both IPv4 and IPv6 traffic.

In some embodiments, one single VTI is configured at the source gateway for a bundle of multiple different SAs. The destination gateway is similarly configured with a single corresponding VTI for the bundle of different SAs. Each SA has a different SPI value associated therewith, and the tuples of header values of packets communicated across the different VPN tunnels may hash to different CPUs at the destination gateway for processing, as will be described further below.

Figure 3:
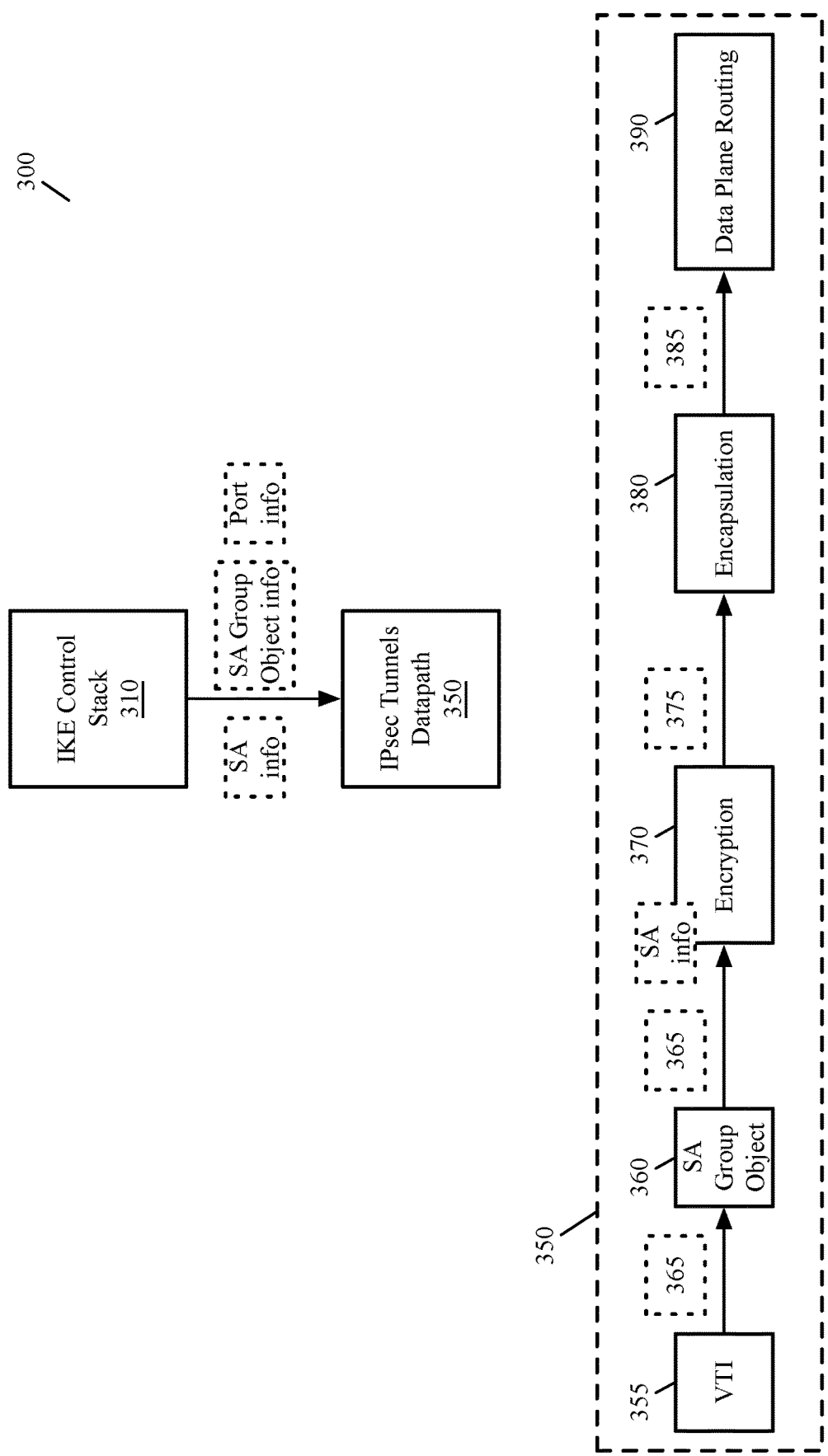
FIG. 3 illustrates a block diagram of a system that is implemented in a gateway or edge appliance of a datacenter, in some embodiments, such as an initiator gateway.

FIG. 3 illustrates a block diagram of a system 300 that is implemented in a gateway or edge appliance of a datacenter, in some embodiments, such as the initiator gateway 110. The system 300 may be implemented by a bare metal computing device or a host machine running virtualization software that operates the gateway in one or more virtual machines. In some embodiments, the system 300 represents VPN control plane. Also, in some embodiments, the system 300 is utilized by the initiator (i.e., source) of a communications session, while in other embodiments, both the initiator and responder (i.e., destination) utilize the system 300.

As illustrated, the system 300 implements an IKE-control stack 310 and IPsec tunnels datapath 350. In some embodiments, the IKE-control stack 310 is a submodule of the VPN control plane, while the IPsec tunnels datapath 350 represents the VPN dataplane. In some embodiments, the modules 310 and 350 are modules of software instructions being executed by one or more processing units (e.g., a processor) of a computing device. In some embodiments, the modules 310 and 350 are modules of hardware circuits implemented by one or more integrated circuits (ICs) of an electronic apparatus. Though the modules 310 and 350 are illustrated as being separate modules, some of the modules can be combined into a single module.

The IKE control stack 310 controls the operations of IPsec, including establishing and maintaining VPN session and SAs. The IKE control stack provides the necessary key data to IPsec tunnels datapath 350 for authenticating and encrypting payloads (e.g., SA information, SA group object information, and port information for encapsulation). The IPsec tunnels datapath 350 performs the operations of the individual VPN tunnels, in some embodiments, and is responsible for path selection.

In some embodiments, The IPsec tunnels datapath 350 may include various VPN data plane modules. The IPsec tunnels datapath 350 also performs encryption and authentication of payload based on the SA information provided by the IKE control stack 310 based on SA selections performed by the SA group object 360 of the IPsec tunnels datapath 350. The IPsec tunnels datapath also encapsulates the encrypted payload in a UDP header, according to some embodiments.

When an application uses the gateway to send certain application data in a VPN session, the IPsec tunnels datapath 350 receives the application data at the dual-stack routing interface VTI 355. The application data is then packaged as an inner packet 365. The dual-stack VTI 355 calculates a hash value using a five-tuple identifier based on the inner packet 365. An SA group object 360 created during an initial IKE session (e.g., IKE session 100) then performs a load balancing operation based on the calculated hash value to select an SA for the data message.

An encryption module 370 encrypts the inner packet into an IPsec encrypted packet 375 according to the encryption parameters of the SA information provided by the IKE control stack 310 and associated with the SA selected by the SA group object 360. The encryption module 370 also appends other IPsec related fields based on the SA information (e.g., ESP header (encapsulating security payload header), ESP trailer, ESP authentication, new IP, etc.). An encapsulation module 380 encapsulates the IPsec encrypted packet 375 as UDP encapsulated packet 385 with a UDP encapsulation header, which may include an SPI associated with the selected SA. A data plane routing module 390 then sends the UDP encapsulated packet 385.

Figure 4:
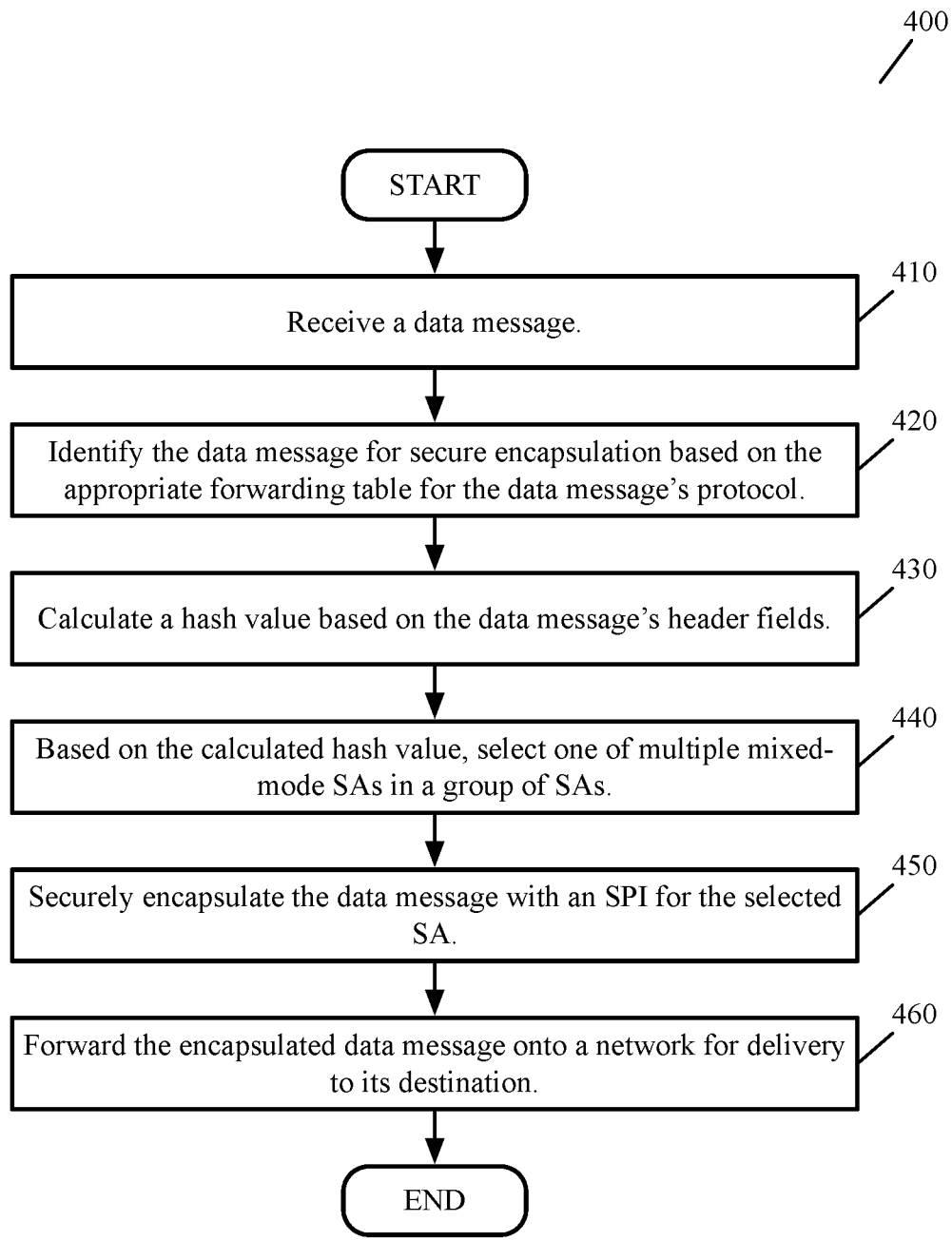
FIG. 4 illustrates a process performed to enable and utilize mixed-mode, grouped SAs, in some embodiments.

FIG. 4 illustrates a process for processing data messages at a gateway for which mixed-mode, grouped SAs have been enabled, in some embodiments. The process 400 is performed, in some embodiments, by an initiator of a secure communications session following IKE negotiations between the initiator and a responder (e.g., following the IKE session 100). The process 400 will be described below with reference to FIG. 5, which conceptually illustrates a more detailed work flow within an initiator (e.g., gateway device) of a secure communications session (e.g., a VPN session), according to some embodiments.

The process 400 starts by receiving (at 410) a data message. The data message, in some embodiments, has source and destination addresses formatted according to a first or second protocol. In some embodiments, the first protocol is IPv4 and the second protocol is IPv6. The protocol, in some embodiments, depends on the intervening network.

The process identifies (at 420) the data message for secure encapsulation based on the appropriate forwarding table for the data message's protocol. For example, the work-flow diagram 500 illustrates a dual-stack VTI 515 that receives IPv4 data messages 505 according to IPv4 routing entries 520 of an IPv4 forwarding table, and receives IPv6 data messages 510 according to IPv6 routing entries 525 of an IPv6 forwarding table. The dual-stack VTI, in some embodiments, is associated with the multiple secure connections and points to the SA group object.

The process calculates (at 430) a hash value based on the data message's header fields. In some embodiments, the dual-stack VTI is responsible for calculating the hash value. The dual-stack VTI, in some embodiments, calculates the hash value using a five-tuple identifier (i.e., source and destination IP addresses, source and destination port addresses, and protocol) identified from the data message's header fields.

Based on the calculated hash value, the process selects (at 440) one of the SAs from the multiple mixed-mode, grouped SAs for the data message. For instance, the SA group object 530 uses the five-tuple hash value 535 to select one of the mixed-mode SAs 540 and 545. In some embodiments, using the five-tuple hash value 535 allows the SA group object 530 to load balance across the multiple mixed-mode SAs 540 and 545 to select one for the data message. As a result, data messages are evenly distributed between the mixed-mode SAs, in some embodiments. It should be noted that in some embodiments, typically only the first data message in a data message requires a full processing of the data message and lookup of the mixed-mode SAs (referred to as slow path processing). This result can be cached and used for (fast path) processing of subsequent data messages in the data message flow in some embodiments.

The process securely encapsulates (at 450) the data message with an SPI for the selected SA. During fast path processing, when the data message belongs to a flow that includes data messages that have already been processed, the SPI is retrieved from the cached results associated with the data message flow. Each of the mixed-mode SAs encapsulates data messages using network addresses formatted according to the first protocol, according to some embodiments. In the work-flow diagram 500, the securely encapsulated data message 550 is illustrated as having an outer IP header, an ESP header that includes an identifier SPI-1 indicating its association with the SA 540, while the inner packet can be either a v4 or v6 inner packet. Similarly, the data message 555 is illustrated as having an outer IP header, an ESP header that includes an identifier SPI-2 indicating its association with the SA 545, while the inner packet can also be either a v4 or v6 inner packet.

The process then forwards (at 460) the encapsulated data message onto a network (e.g., to an identified next hop) for delivery to its destination, then ends. For instance, the initiator gateway 110 in the VPN session 200 described above can forward encapsulated data messages onto the network 105 for delivery to the responder gateway 115 via either the tunnel 230 or 235, depending on which SA has been selected for the data messages. Additionally, the workflow diagram 500 illustrates a route entry for the outer destination IP 570 from a forwarding table used to forward data messages onto a network. Based on the route entry 570, the data message is forwarded on the network via one of the virtual network interfaces (VNICs) 560 and 565. In some embodiments, before forwarding the data message to the next hop, the process also performs next hop selection (i.e., selection of an output interface). Some embodiments determine whether NAT-T is turned on in IPsec (e.g., whether the data message has UDP source and destination ports both set to 4500). If NAT-T is in use, then the UDP header is skipped and load balancing is performed using the SPI.

In some embodiments, the gateway processes multiple data messages using either IPv4 or IPv6 network addresses because machines (either executing on the gateway device or behind the gateway device) use a combination of IPv4 and IPv6 addresses. As a result of the load balancing operation performed by the SA group object, which does not depend on whether the inner packet is IPv4 or IPv6, the totality of data messages associated with the first and second protocols (i.e., using either IPv4 or IPv6 network addresses) processed by the gateway are evenly distributed between the multiple mixed-mode SAs, according to some embodiments, which in some embodiments also leads to even distribution across paths between the initiator and responder.

In some embodiments, when encapsulating and forwarding the encapsulated data message, the sender behaves in different manners depending on whether NAT-T is enabled. As described above, in some embodiments the mixed-mode SAs are enabled during IKE negotiations following a determination that NAT-T should be enabled (e.g., based on detection of a NAPT device in the path between a source and destination). When NAT-T is enabled, mixed-mode SAs and use of an SA group object (e.g., as described above) can help achieve better load distribution, especially if multi-homing is in use (i.e., when the sending gateway device has multiple network address interfaces, because it is connected to multiple different service providers or for another reason).

Figure 6:
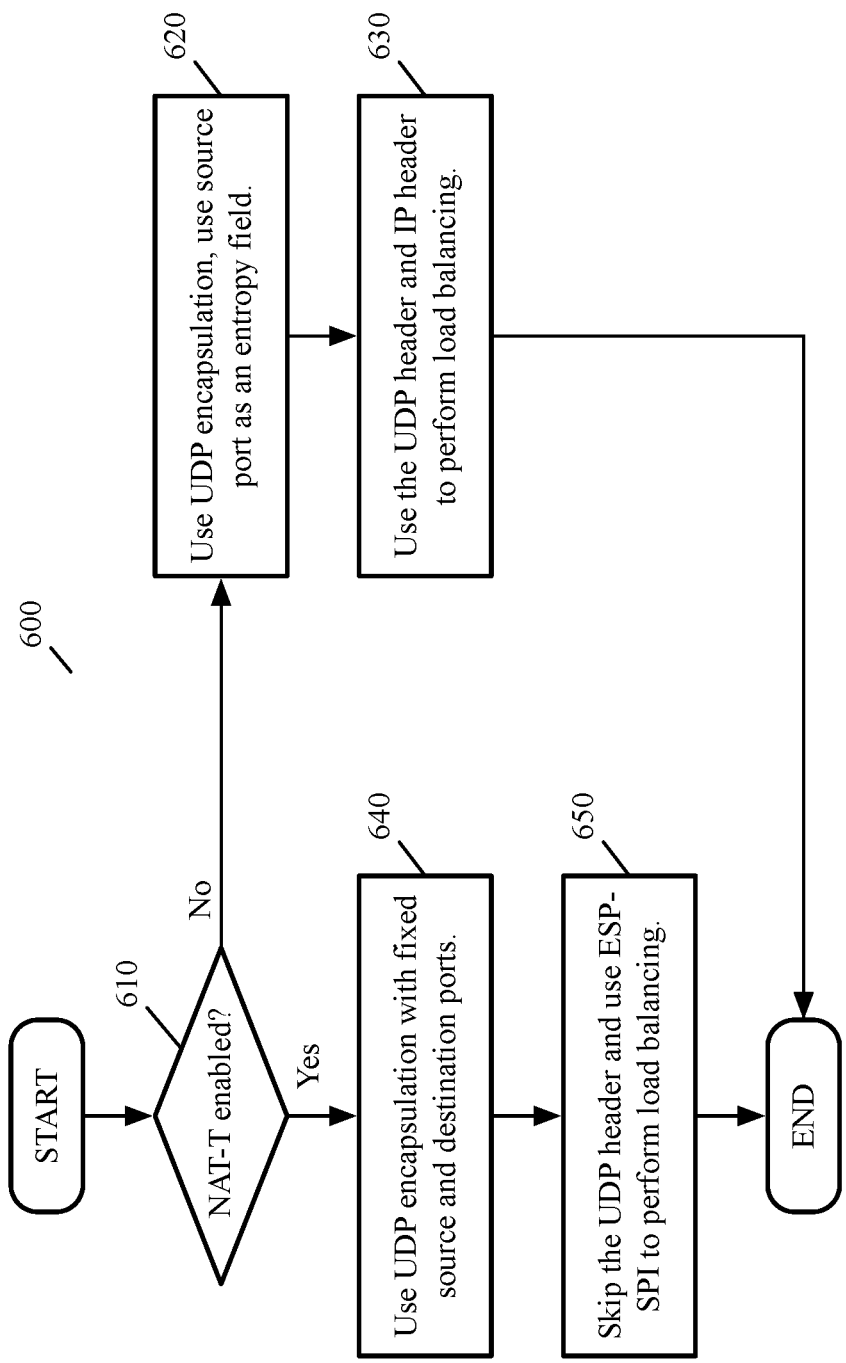
FIG. 6 conceptually illustrates a process of some embodiments for encapsulating a data message and selecting an output interface for the data message.

FIG. 6 conceptually illustrates a process of some embodiments for encapsulating a data message and selecting an output interface for the data message. It should be understood that this is a conceptual process representing various different options, and that a sending device would not necessarily go through the process of making an actual determination as to whether NAT-T is enabled each time a data message is sent out, but rather would be configured differently based on whether or not NAT-T is enabled.

As shown, the process 600 begins by determining (at 610) whether NAT-T is enabled. During IKE negotiations to set up the SA(s) of some embodiments, the IKE control stack determines whether an intermediate NAPT device is situated in the path to be taken by the encrypted data messages. In this case, the IKE control stack enables NAT-T for the SA. In some embodiments, whether NAT-T is enabled dictates whether or not the UDP source port of the outer header will be used as an entropy field (i.e., whether this field will be changed between data message flows as a mechanism to differentiate these flows).

When NAT-T is not enabled, the process uses (at 620) UDP encapsulation with the source port as an entropy field. That is, when NAT-T is not enabled, the use of a fixed source port is not required and the source port can be varied. Because the source port can be varied, the process uses (at 630) the UDP and IP headers (e.g., the outer header 5-tuple) for load balancing between the output interfaces. In such cases, there is presumably not a NAPT device in the path so there is no need to use the fixed NAT-T source port. In the diagram 500 described above, for instance, the process 600 would use the outer IP headers of the encapsulated data messages 550 and 555, in some embodiments, to load balance between the VNICs 560 and 565 if NAT-T is not enabled. Following 630, the process 600 ends.

When NAT-T is enabled, the process 600 uses (at 640) UDP encapsulation with fixed source and destination ports (e.g., the fixed port number 4500 designated for NAT-T). For load balancing, the process 600 skips the UDP header and instead uses (at 650) the SPI to perform load balancing for the data message. In this situation, the use of multiple mixed-mode SAs (and therefore different SPIs) allows for better load distribution between the different output interfaces. For example, in the diagram 500, the process 600 would use the SPIs specified in the ESP headers of the encapsulated data messages 550 and 555 to load balance between the VNICs 560 and 565 if NAT-T is enabled, according to some embodiments. Following 650, the process 600 ends.

Figure 7:
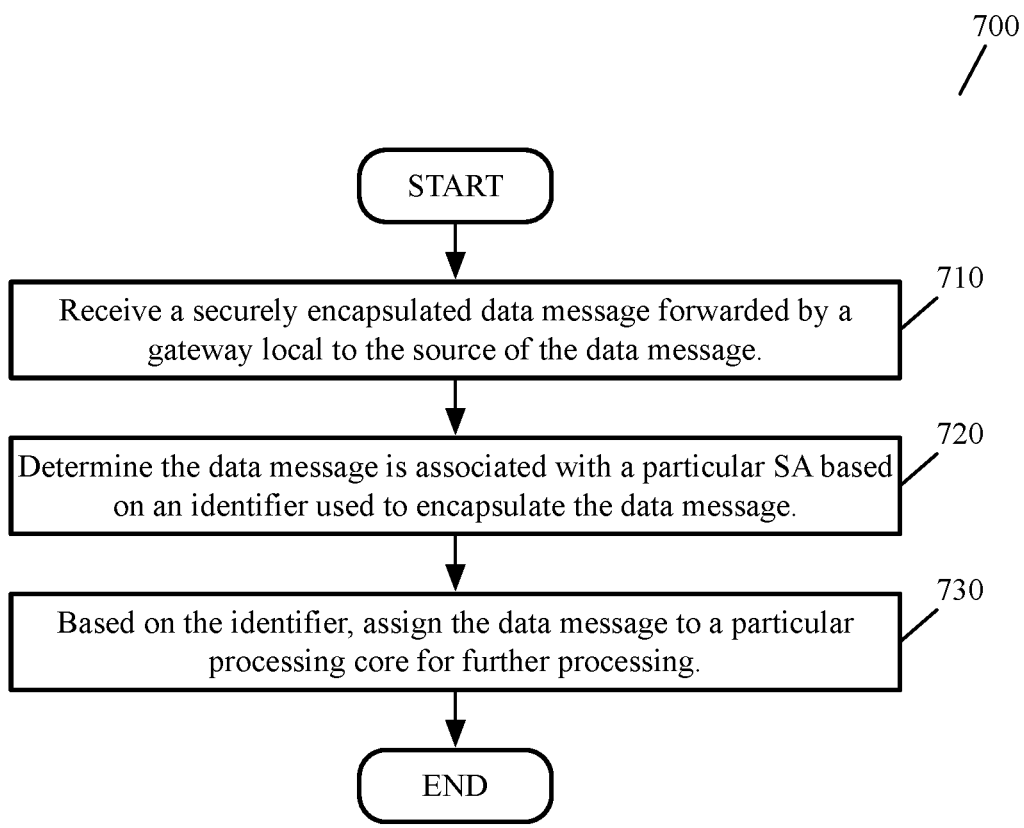
FIG. 7 illustrates a process performed by the destination gateway, in some embodiments, upon receiving a securely encapsulated packet.

In some embodiments, the data message that is securely encapsulated by the selected SA has an outer destination address (i.e., outer IP header) of the destination gateway device that receives the securely encapsulated data message. FIG. 7 illustrates a process performed by the destination gateway, in some embodiments, upon receiving a securely encapsulated packet. The process 700 starts by receiving (at 710) a securely encapsulated data message forwarded by a gateway local to the source of the data message. For instance, in the VPN session 200 described above, the responder gateway 115 receives data from the initiator gateway 110 via any of paths associated with VPN tunnels 230 and 235.

The process determines (at 720) that the data message is associated with a particular SA based on an identifier used to encapsulate the data message. As described above, data messages are securely encapsulated by the initiator gateway (i.e., by a process executing within the initiator gateway) with an SPI for the selected SA. For example, the securely encapsulated data message 550 of the work-flow diagram 500 includes an ESP header specifying an identifier SPI-1 to indicate the data message is associated with the SA 540, and the securely encapsulated data message 555 has an ESP header specifying an identifier SPI-2 to indicate the data message is associated with the SA 545.

Based on the identifier, the process assigns (at 730) the data message to a particular processing core in a set of processing cores of the gateway for further processing. As described above, the responder gateway is configured similarly to the initiator gateway with a single corresponding VTI for a bundle of different SAs each having a different associated SPI value, and the tuples of header values of data messages communicated across different VPN tunnels may hash to different CPUs at the responder gateway for processing, according to some embodiments. Additionally, if the UDP source and destination ports are the same (i.e., 4500), then the UDP header is skipped and a core is assigned using the SPI. Following 730, the process 700 ends.

In some embodiments, the destination gateway only uses the SPI to assign data messages to a particular processing core if the UDP encapsulation header of the data message has the same source and destination port (e.g., 4500, because NAT-T is in use). That is, when the sending gateway uses the source port of the UDP encapsulation header as an entropy field, this source port can be used to assign data messages to different processing cores at the receiving gateway. However, if the UDP header is the same for all of the data messages (because NAT-T is enabled), then the SPI is used instead.

In some embodiments, as a result of the initiator gateway selecting among the multiple mixed-mode SAs by load balancing across the SAs, the data messages received at the responder gateway device are load balanced among the processing cores of the second gateway device. As a result, the responder gateway in some embodiments experiences better central processing unit (CPU) utilization and improved performance.

Figure 5:
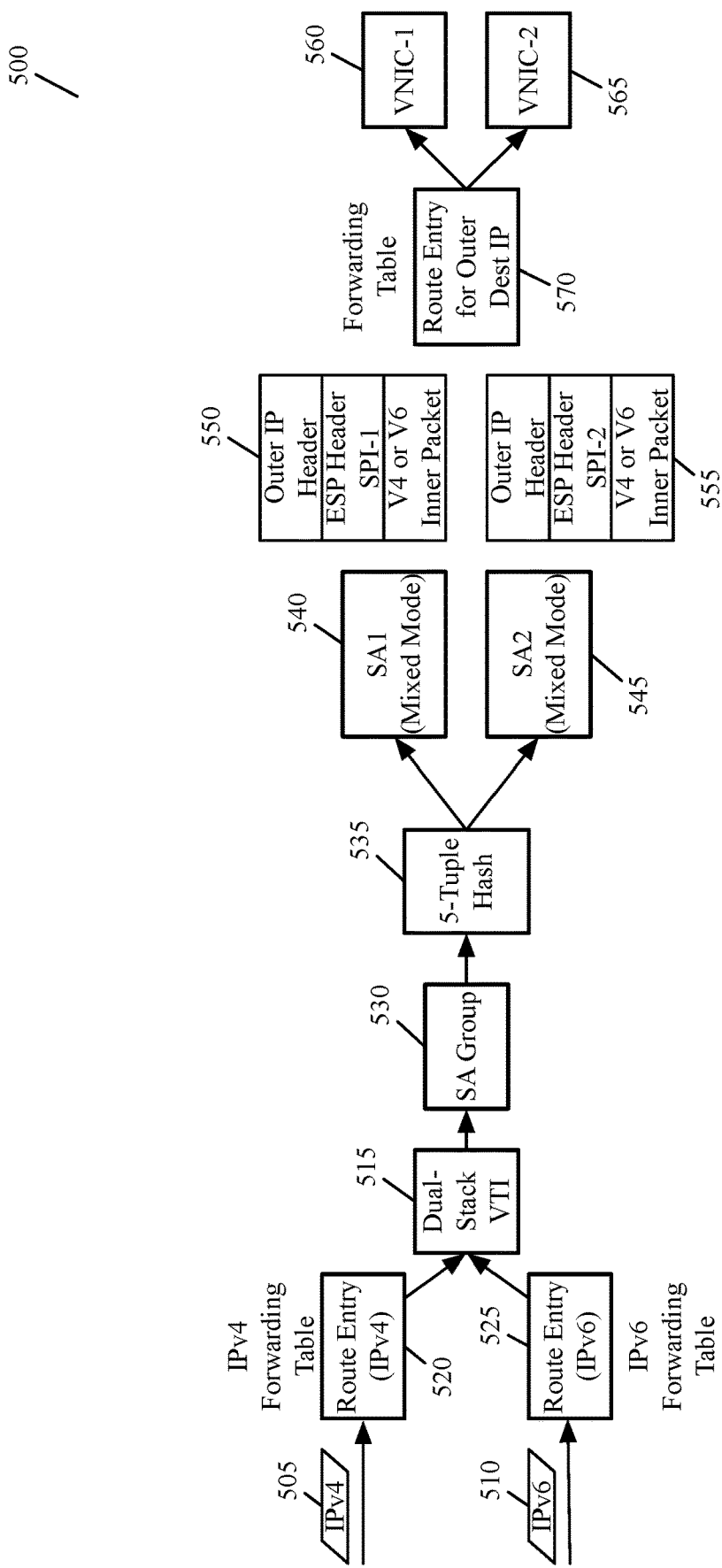
FIG. 5 conceptually illustrates a more detailed work flow within an initiator (e.g., gateway device) of a secure communications session, according to some embodiments.
Figure 8:
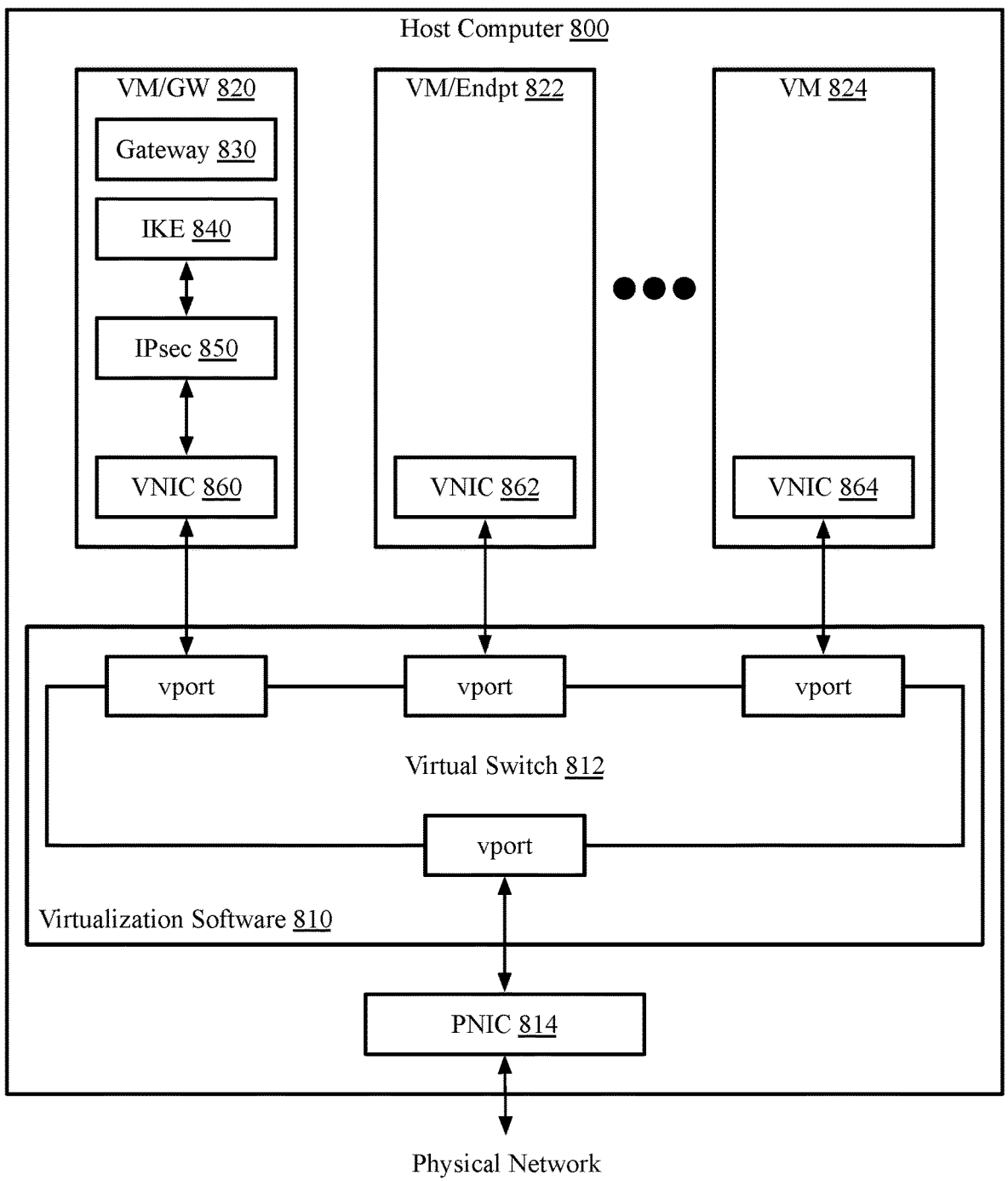
FIG. 8 illustrates a block diagram of a host machine of some embodiments for use in a virtualized networking environment.

In some embodiments, the operations shown in FIG. 5 are implemented by a virtual machine, container, or other data compute node that operates as the sending gateway in a virtualized environment. FIG. 8 illustrates a block diagram of a host computer 800 of some embodiments in a virtualized networking environment. As illustrated, the host computer 800 includes virtualization software 810, a PNIC 814 (physical network interface card), and multiple virtual machines (VMs) 820, 822, and 824.

In some embodiments, the host computer 800 is a physical general-purpose computer (e.g., a server, workstation, etc.) and includes one or more physical central processing units (CPUs), a system memory, and non-volatile data storage. The host computer 800 also includes one or more physical network interfaces, such as PNIC 814, for communicating with other hardware computing platforms, entities, or host computers on a physical network accessible through PNIC 814. In some embodiments, the host computer 800 may provide part of the computing infrastructure in a virtualized computing environment distributed among multiple host computers. Though certain embodiments are described herein with respect to VMs, the same principals and techniques may also apply to other appropriate virtualized data compute nodes (e.g., virtual machine, container, pod, data compute node, isolated user space instance) as well as physical computing devices.

The virtualization software 810 (e.g., a hypervisor) serves as an interface between VMs 820-824 and the PNIC 814, as well as other physical resources (e.g., CPUs, memory, etc.) available on host computer 800, in some embodiments. Each of the VMs 820-824 is shown including a VNIC 860-864 respectively, which is responsible for exchanging packets between each respective VM and the virtualization software 810. The architecture of the virtualization software 810 may vary across different embodiments of the invention. In some embodiments, the virtualization software 810 can be installed as system-level software directly on the host computer 800 (i.e., a "bare metal" installation) and be conceptually interposed between the physical hardware and the guest operating systems executing in the VMs. In other embodiments, the virtualization software 810 may conceptually run "on top of" a conventional host operating system in the server.

In some embodiments, the virtualization software 810 includes both system-level software and a privileged VM (not shown) configured to have access to the physical hardware resources (e.g., CPUs, physical interfaces, etc.) of the host computer 810. While the VNICs 860-864 are shown as included in the VMs 820-824, it should be understood that VNICs 860-864 may be implemented by code (e.g., VM monitor code) associated with virtualization software 810 in some embodiments, while in other embodiments, the VNICs 860-864 may be software implementations of PNICs. Each of the VMs 820-824 is connected to a virtual port (also referred to herein as a vport or virtual interface) provided by a virtual switch 812 through the VNICs 860-864 associated with the VMs. In some embodiments, the virtual switch 812 serves as physical network switch (i.e., serves as an edge device on the physical network, but is implemented in software). The virtual switch 812 is connected to the PNIC 814 in order to allow network traffic to be exchanged between the VMs 820-824 executing on host computer 800 and destinations on an external physical network.

In some embodiments, a VM executing on the host computer 800 is configured to perform the functions of a gateway. For instance, the VM 820 in this example is configured as a gateway, such as the initiator gateway 110, and includes a gateway layer or component 830 that logically represents a set of instructions for implementing gateway functions. The gateway VM 820 is also configured with an IKE control stack 840 (also referred to as an IKE daemon) similar to the IKE control stack 310 described above. In some embodiments, the IKE control stack 840 logically represents a set of instructions for performing a two-phase IKE negotiation with an IKE control stack of a peer gateway (e.g., responder gateway 115) in order to establish an IKE tunnel and one or more IPSec tunnels. The IKE control stack 840 of some embodiments is also configured with one or more dead peer detection (DPD) techniques for determining whether the IKE control stack of the peer gateway is "dead" or "alive." For example, TKE control stack 840 may be configured to transmit one or more trigger messages to the IKE control stack of the peer gateway to determine its liveliness. Two IKE control stacks that have established an IKE tunnel among themselves are referred to as IKE peers.

The gateway VM 820 of some embodiments is also configured to implement IPsec protocols and functionality using an IPsec tunnels datapath 850. Like the IPsec tunnels datapath 350 described above, the IPsec tunnels datapath 850 of some embodiments encrypts outgoing packets destined for a particular destination gateway, such as the responder gateway 115, by encapsulating the outgoing packets with, e.g., ESP headers based on a corresponding outbound SA. In each packet's ESP header, IPsec tunnels datapath 850 also includes an SPI value, associated with the outbound SA. IPsec tunnels datapath 850 is also configured to decrypt incoming encapsulated ESP encrypted packets received from a source gateway, such as responder gateway 115.

In some embodiments, another VM executing on host computer 800, or on another host computer, may be configured as an endpoint associated with the gateway VM 820. For instance, the VM 822 in this example is an endpoint VM 822 associated with gateway VM 820. In some embodiments, a source endpoint at a first site may generate a packet to send to a destination endpoint at a second site. For instance, in the VPN session 200 described above, a source endpoint operating in the datacenter 120 may want to send a packet to a destination endpoint operating in the datacenter 125. To do so, the source endpoint in the datacenter 120 may forward the packet to initiator gateway 110, which performs a process such as the process 400 described above to prepare and forward the packet onto a network for delivery to its destination.

When a packet is received at the host computer 800, in some embodiments, the packet is provided to the virtual switch 812 of host computer 800 via the PNIC 814. In some embodiments, the virtual switch 812 sends the encapsulated encrypted packet to VNIC 860 of gateway VM 820. Subsequently, the gateway VM 820 performs a process such as the process 700 described above on the received packet. It should be noted that while that FIG. 8 illustrates only one example of a gateway, other embodiments may include other virtual computing instances for performing the functions of a gateway. In still other embodiments, the gateway may be a physical computing device.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
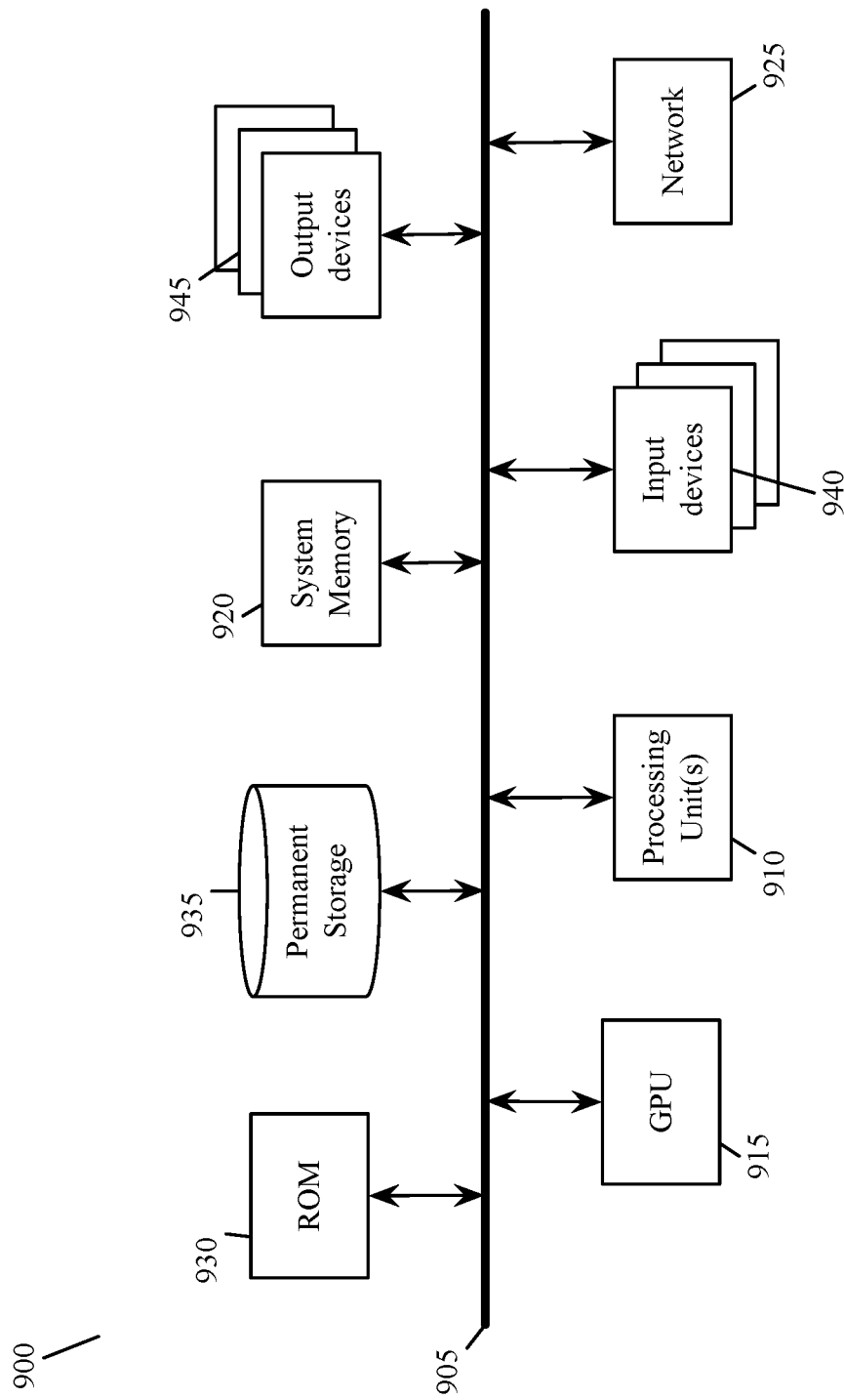
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described hosts, controllers, gateway, and edge forwarding elements. As such, it can be used to execute any of the above described processes. This computer system 900 includes various types of non-transitory machine-readable media and interfaces for various other types of machine-readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) 910 may be a single processor or a multi-core processor in different embodiments. The read-only-memory (ROM) 930 stores static data and instructions that are needed by the processing unit(s) 910 and other modules of the computer system 900. The permanent storage device 935, on the other hand, is a read-and-write memory device. This device 935 is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory 925 is a volatile read-and-write memory, such as random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices 940 enable the user to communicate information and select commands to the computer system 900. The input devices 940 include alphanumeric keyboards and pointing devices (also called "cursor control devices"). The output devices 945 display images generated by the computer system 900. The output devices 945 include printers and display devices, such as cathode ray tubes (CRT) or liquid crystal displays (LCD). Some embodiments include devices such as touchscreens that function as both input and output devices 940 and 945.

Finally, as shown in FIG. 9, bus 905 also couples computer system 900 to a network 965 through a network adapter (not shown). In this manner, the computer 900 can be a part of a network of computers (such as a local area network ("LAN"), a wide area network ("WAN"), or an Intranet), or a network of networks (such as the Internet). Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of forwarding encrypted packets between a source and a destination, the method comprising:
   receiving a data message flow that uses an IPv4 (Internet Protocol version 4) protocol or an IPv6 (version 6) protocol;
   selecting one mixed-mode security association (SA) from a plurality of mixed-mode SAs, each mixed-mode SA for use to encrypt IPv4 or IPv6 data message flows;
   using the selected mixed-mode SA to encrypt and encapsulate the data message flow; and
   forwarding the encapsulated data message flow to the destination, wherein the encapsulation comprises an identifier for the selected SA.

2. The method of claim 1, wherein selecting the mixed-mode SA comprises performing a load balancing operation to select the mixed-mode SA from the plurality of SA.

3. The method of claim 2, wherein performing the load balancing operation comprises using a set of attributes of the data message flow to perform the load balancing operation.

4. The method of claim 3, wherein the set of attributes comprises a set of one or more header values of the data message flow.

5. The method of claim 4, wherein using the set of attributes comprises:
   generating a hash value from the set of header values;
   using the generated hash value to select the mixed-mode SA from the plurality mixed-mode SAs.

6. The method of claim 1, wherein the method is performed by a first gateway device of a first site that includes a source machine from which the data message flow originates.

7. The method of claim 6 further comprising:
   before receiving the data message:
      during a key exchange session with a second gateway device of a second site that includes a destination machine to which the data message flow is destined;
      creating the plurality of SAs; and
      enabling a mixed mode for each of the plurality of SAs to allow each SA to be useable for encrypting IPv4 or IPv6 flows.

8. The method of claim 6, wherein each encapsulated data message of the flow has an outer destination address of a second gateway device that receives the encapsulated data message and assigns the data message to a particular one of its processing cores based on the identifier for the selected SA.

9. The method of claim 1 further comprising, prior to selecting one of the plurality of SAs, performing a routing operation by using an IPv4 or an IPv6 routing table based on whether the data message flow is an IPv4 or IPv6 flow.

10. The method of claim 1, wherein the identifier comprises a security parameter index (SPI).

11. A non-transitory machine readable medium storing a program for execution by a set of processing units to forward encrypted packets between a source and a destination, the program comprising sets of instructions for:
    receiving a data message flow that uses an IPv4 (Internet Protocol version 4) protocol or an IPv6 (version 6) protocol;
    selecting one mixed-mode security association (SA) from a plurality of mixed-mode SAs, each mixed-mode SA for use to encrypt IPv4 or IPv6 data message flows;
    using the selected mixed-mode SA to encrypt and encapsulate the data message flow; and
    forwarding the encapsulated data message flow to the destination, wherein the encapsulation comprises an identifier for the selected SA.

12. The non-transitory machine readable medium of claim 11, wherein the set of instructions for selecting the mixed-mode SA comprises a set of instructions for performing a load balancing operation to select the mixed-mode SA from the plurality of SA.

13. The non-transitory machine readable medium of claim 12, wherein the set of instructions for performing the load balancing operation comprises a set of instructions for using a set of attributes of the data message flow to perform the load balancing operation.

14. The non-transitory machine readable medium of claim 13, wherein the set of attributes comprises a set of one or more header values of the data message flow.

15. The non-transitory machine readable medium of claim 14, wherein the set of instructions for using the set of attributes comprises sets of instructions for:
    generating a hash value from the set of header values;
    using the generated hash value to select the mixed-mode SA from the plurality mixed-mode SAs.

16. The non-transitory machine readable medium of claim 11, wherein the program executes on a first gateway device of a first site that includes a source machine from which the data message flow originates.

17. The non-transitory machine readable medium of claim 16, where the program further comprises sets of instructions for:
    before receiving the data message:
        during a key exchange session with a second gateway device of a second site that includes a destination machine to which the data message flow is destined;
        creating the plurality of SAs; and
        enabling a mixed mode for each of the plurality of SAs to allow each SA to be useable for encrypting IPv4 or IPv6 flows.

18. The non-transitory machine readable medium of claim 16, wherein each encapsulated data message of the flow has an outer destination address of a second gateway device that receives the encapsulated data message and assigns the data message to a particular one of its processing cores based on the identifier for the selected SA.

19. The non-transitory machine readable medium of claim 11, wherein the program further comprises a set of instructions for, prior to selecting one of the plurality of SAs, performing a routing operation by using an IPv4 or an IPv6 routing table based on whether the data message flow is an IPv4 or IPv6 flow.

20. The non-transitory machine readable medium of claim 11, wherein the identifier comprises a security parameter index (SPI).

* * * * *